Figure 1:
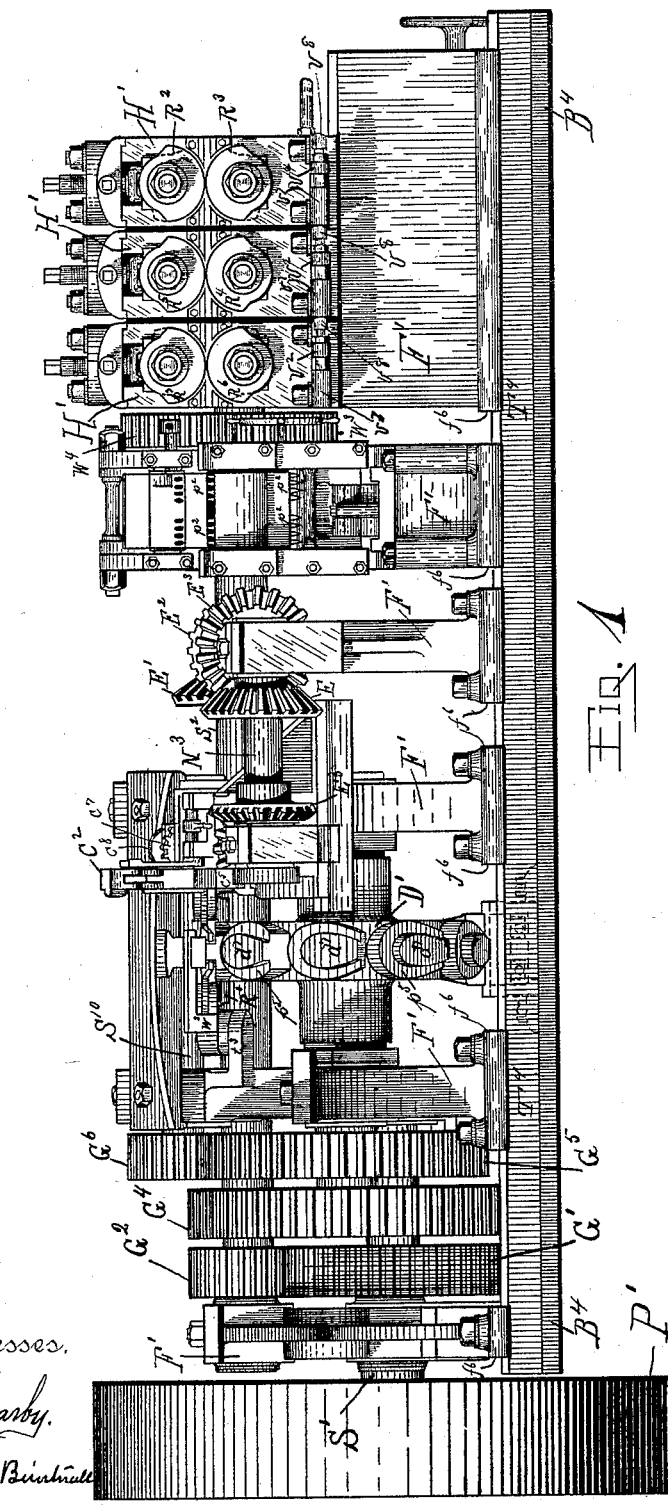

(No Model.) 16 Sheets—Sheet 1.
J. A. BURDEN.
HORSESHOE MACHINE.

No. 391,778. Patented Oct. 30, 1888.

Witnesses. Inventor.
Geo. H. Darby. James A. Burden
Charles S. Birtwhistle by W. E. Hagan atty.

(No Model.) 16 Sheets—Sheet 3.

J. A. BURDEN.
HORSESHOE MACHINE.

No. 391,778. Patented Oct. 30, 1888.

Witnesses
Geo. A. Darby.

Inventor.
James A. Burden.
by W. E. Hagan, Atty.

(No Model.) 16 Sheets—Sheet 4.
J. A. BURDEN.
HORSESHOE MACHINE.
No. 391,778. Patented Oct. 30, 1888.
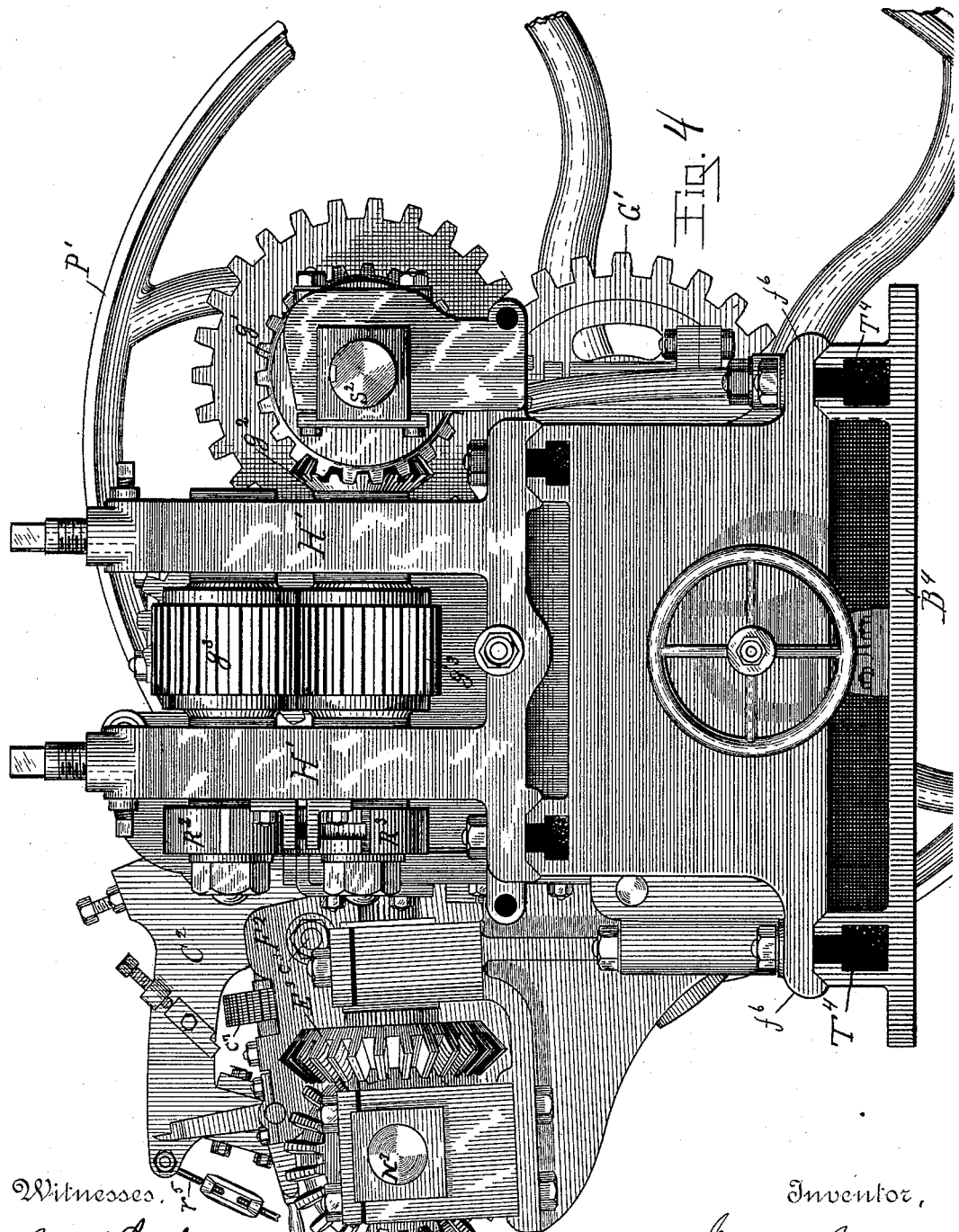
Witnesses
Geo. A. Darby.
Charles S. Brintnall.
Inventor,
James A. Burden.
by W. E. Hagan, atty.

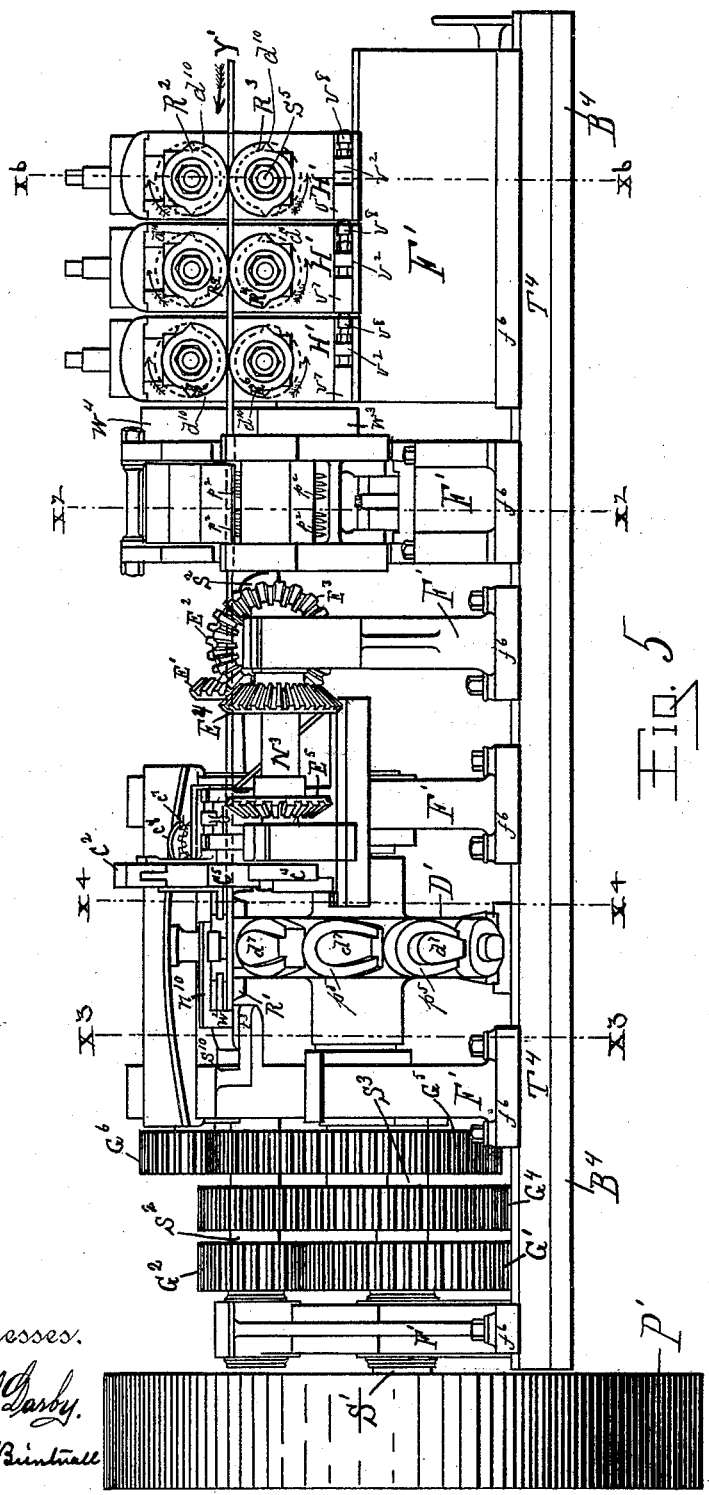

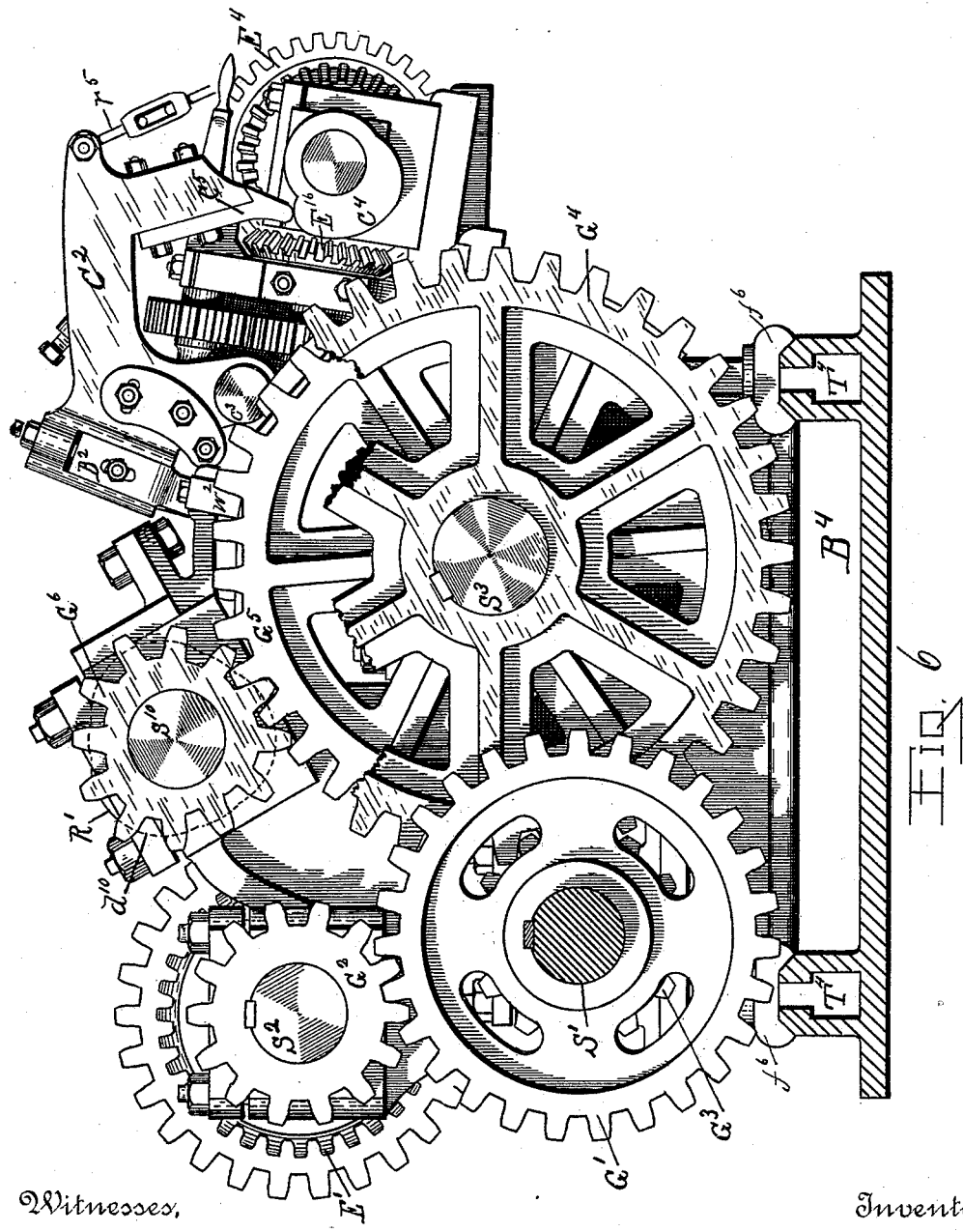

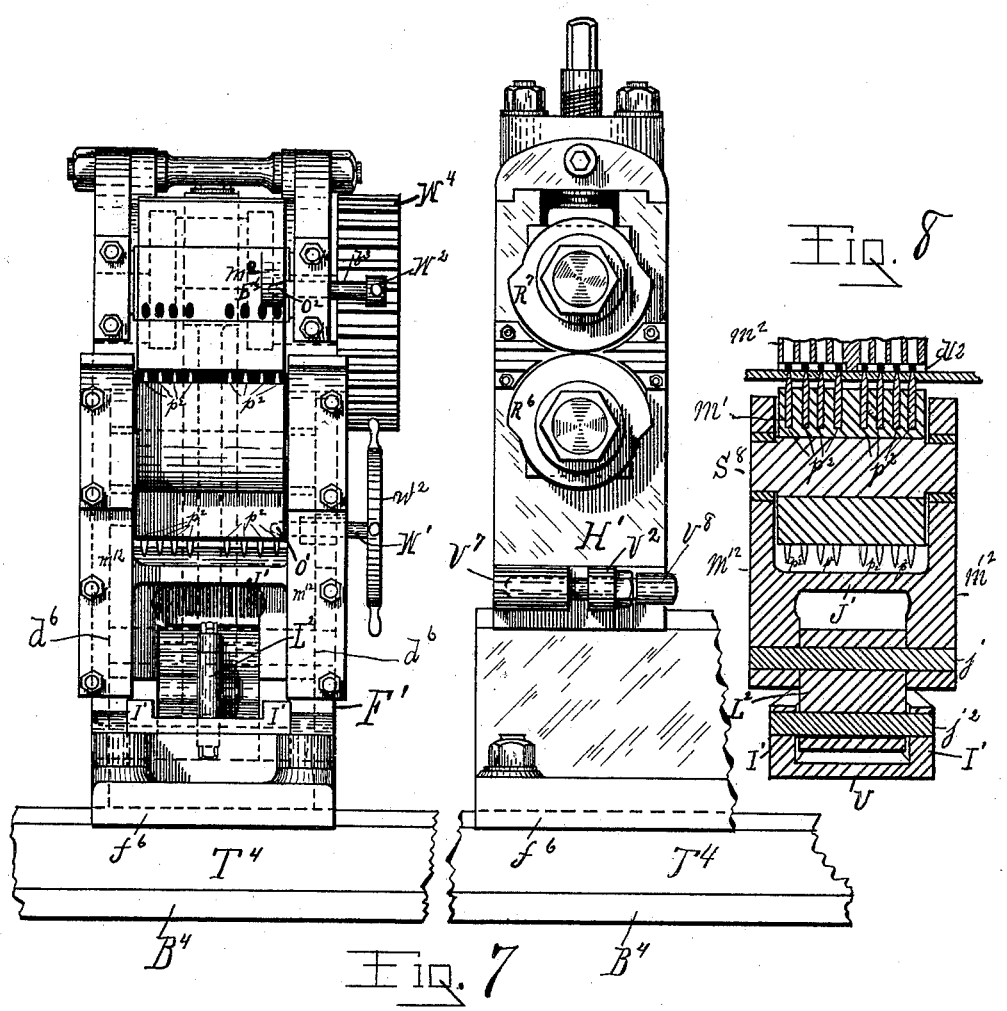

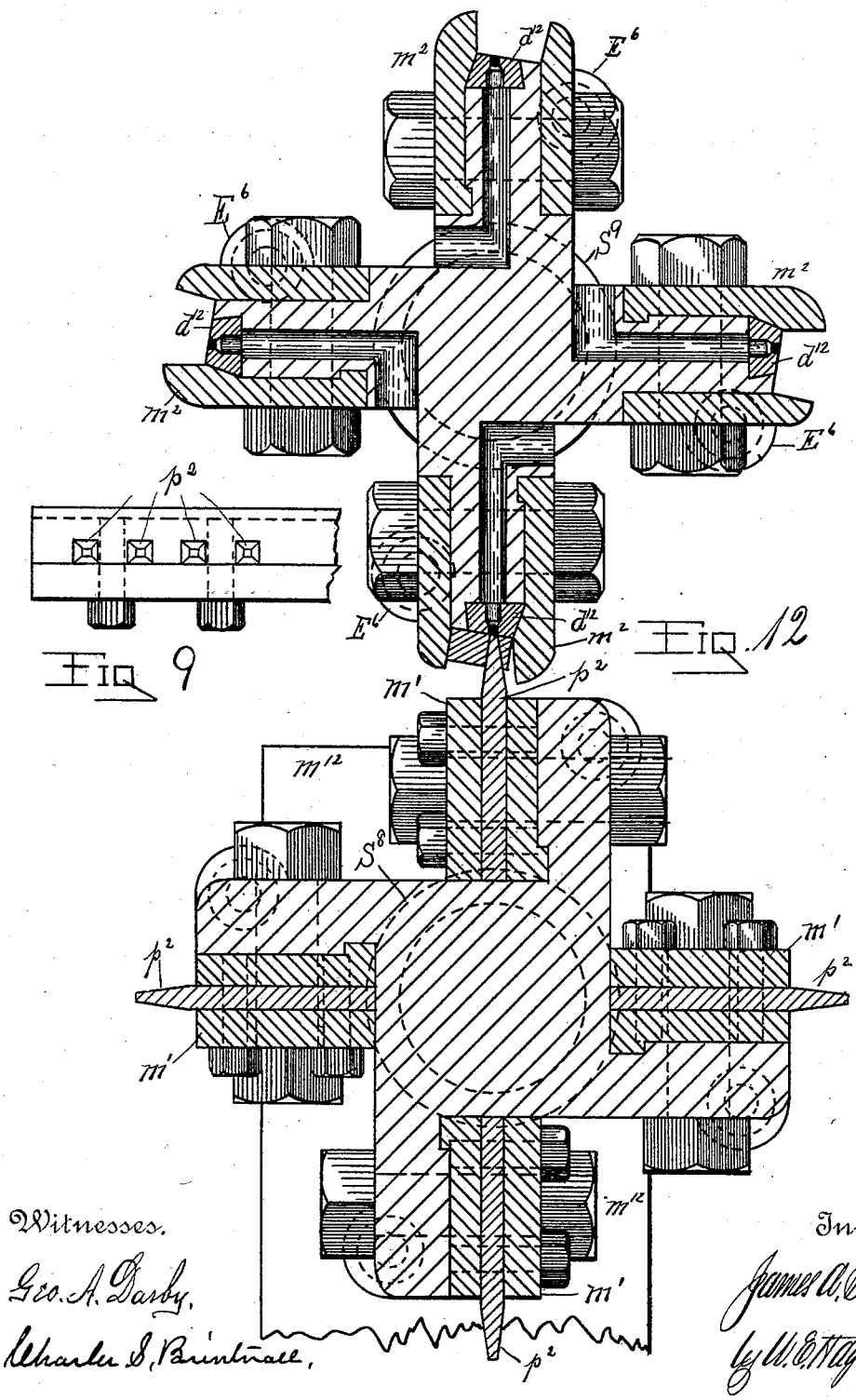

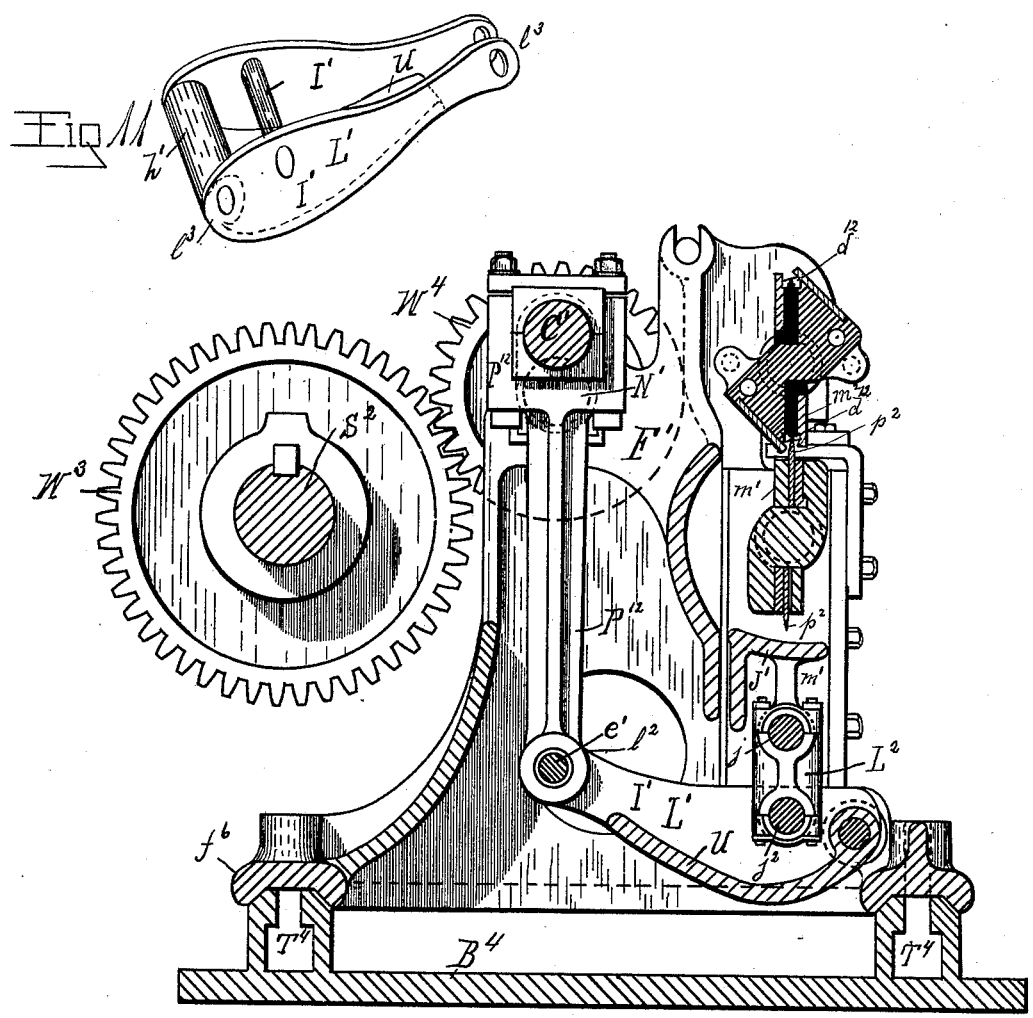

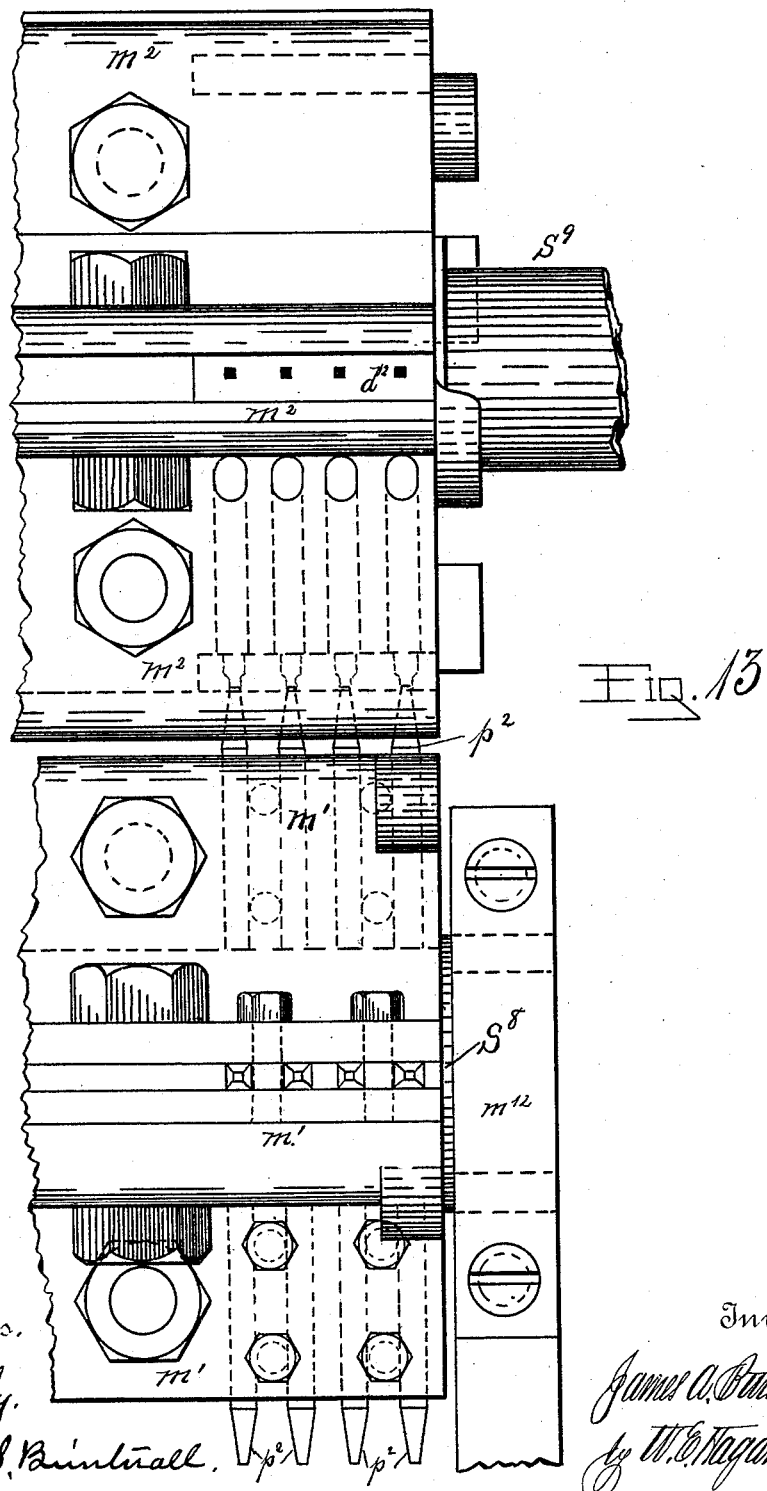

(No Model.)
J. A. BURDEN.
HORSESHOE MACHINE.
No. 391,778. Patented Oct. 30, 1888.
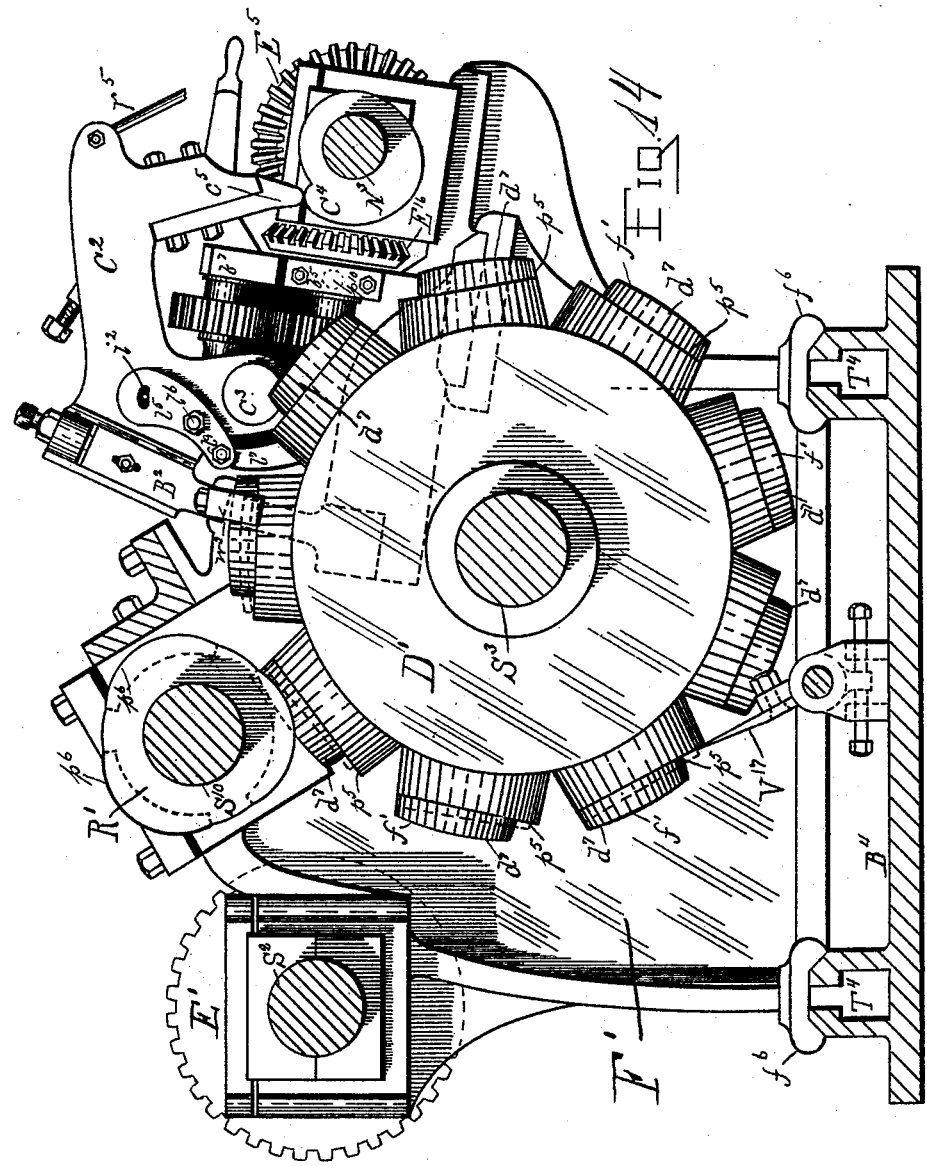
Witnesses.
Geo. A. Darby.
Charles S. Brintnall.
Inventor.
James A. Burden.
By W. E. Hagans, his atty.

(No Model.) 16 Sheets—Sheet 12.

J. A. BURDEN.
HORSESHOE MACHINE.

No. 391,778. Patented Oct. 30, 1888.

Witnesses.
Geo. A. Darby.
Charles S. Brintnall.

Inventor.
James A. Burden.
By W. E. Hagan, his atty.

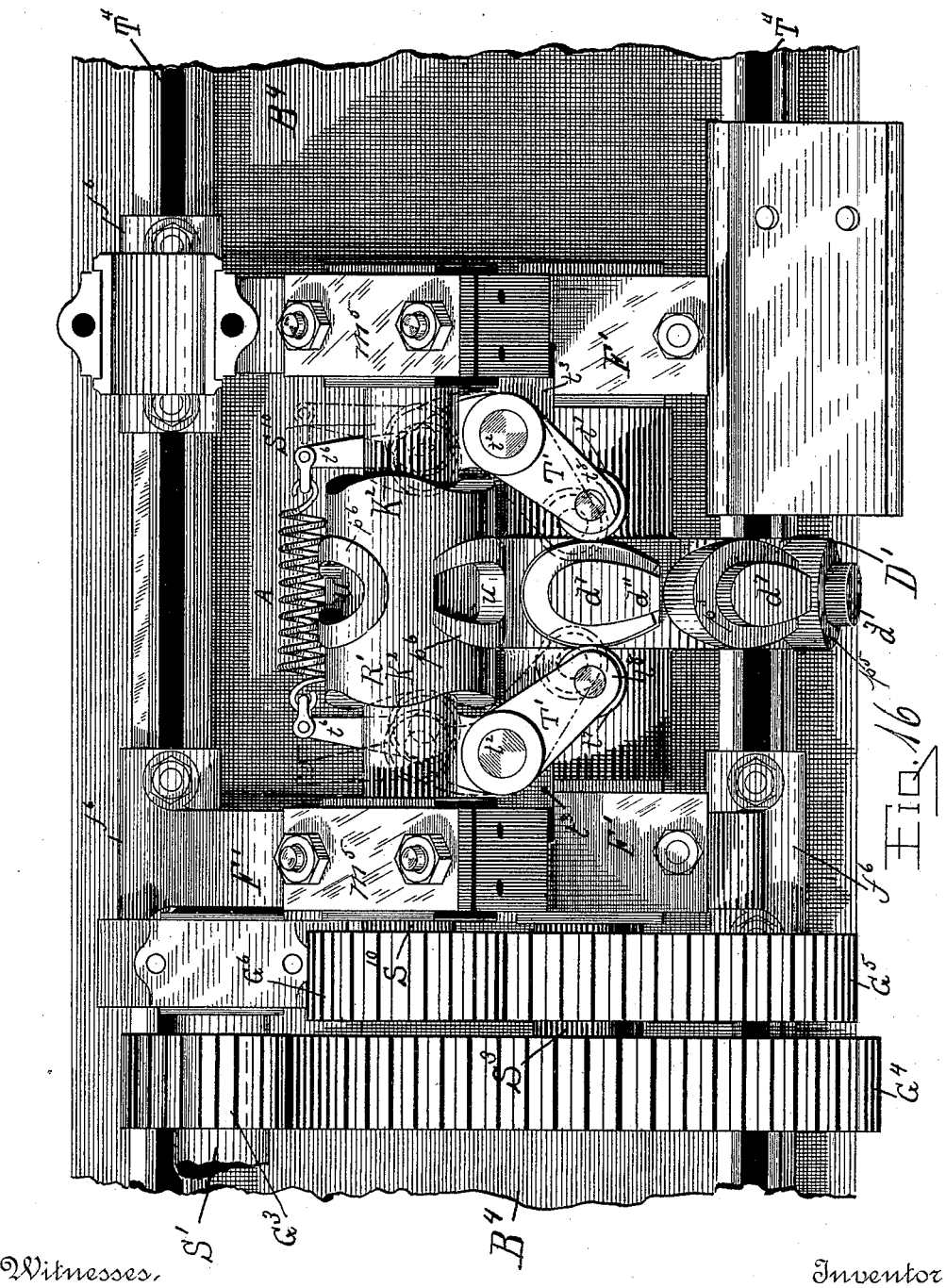

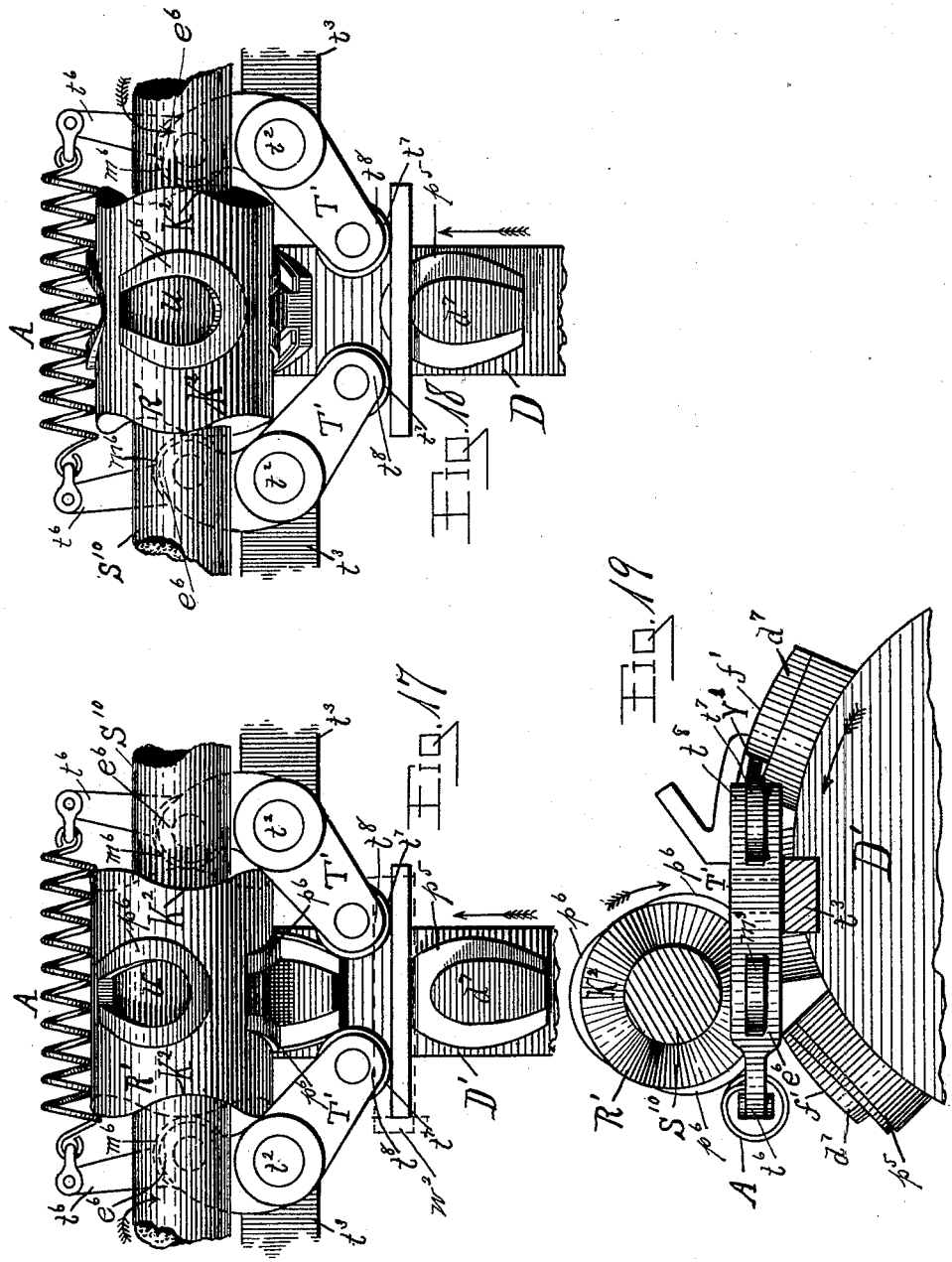

(No Model.)

16 Sheets—Sheet 15.

J. A. BURDEN.
HORSESHOE MACHINE.

No. 391,778. Patented Oct. 30, 1888.

Witnesses.
Geo. A. Darby.
Charles S. Brintnall.

Inventor.
James A. Burden.
By W. E. Hagan. atty.

(No Model.)
J. A. BURDEN.
HORSESHOE MACHINE.
No. 391,778. Patented Oct. 30, 1888.
16 Sheets—Sheet 16.
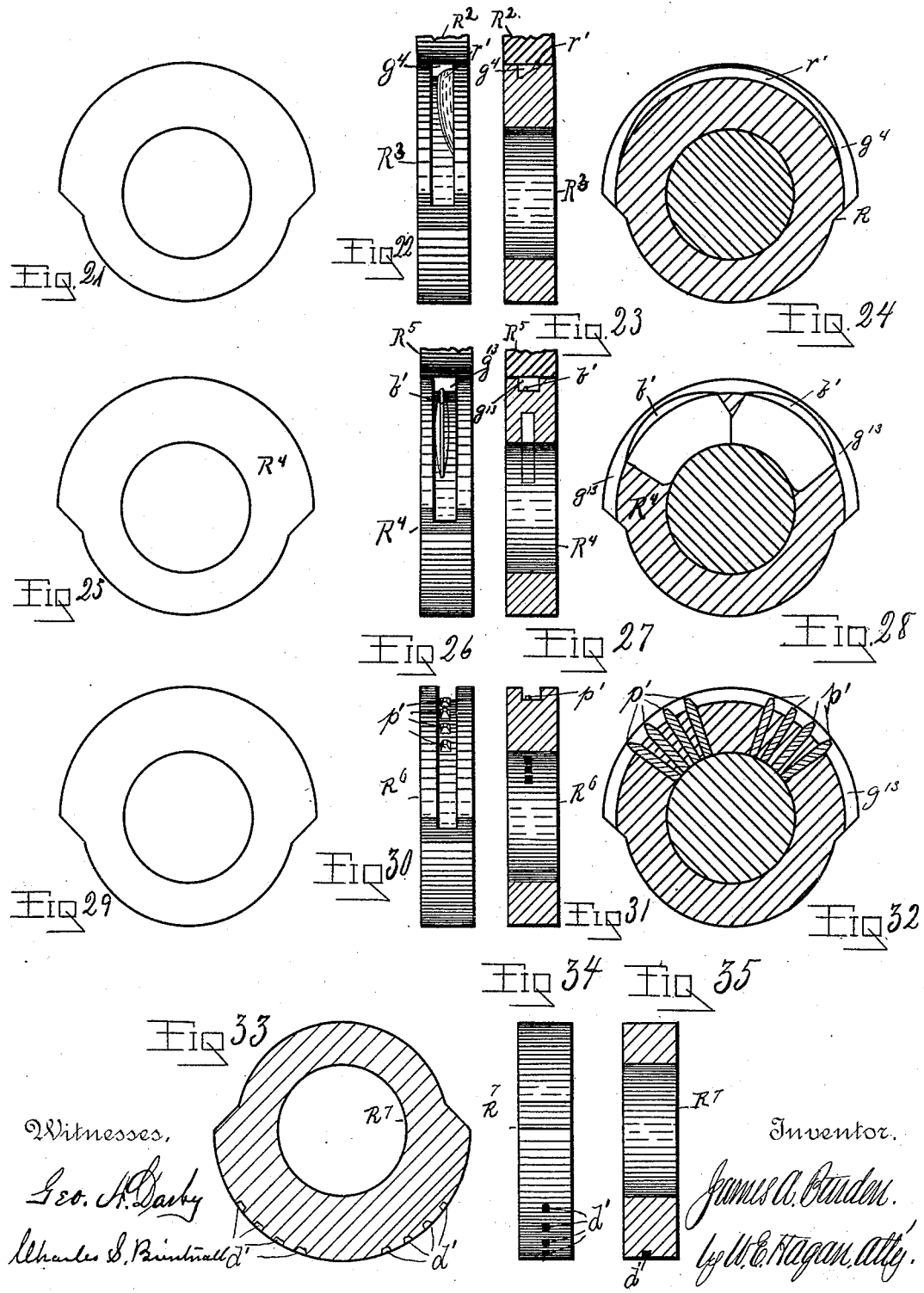

UNITED STATES PATENT OFFICE.

JAMES A. BURDEN, OF TROY, NEW YORK.

HORSESHOE-MACHINE.

SPECIFICATION forming part of Letters Patent No. 391,778, dated October 30, 1888.

Application filed January 7, 1888. Serial No. 260,058. (No model.)

*To all whom it may concern:*

Be it known that I, JAMES A. BURDEN, of the city of Troy, county of Rensselaer, State of New York, have invented new and useful Improvements in Machines for Making Horseshoes, of which the following is a specification.

My invention relates to improvements in machines for making horseshoes, and more particularly to that class of them which are adapted to produce horseshoes from a bar of iron that has been previously shaped and rolled by other mechanism, and which bar as reheated is passed into the machine to be by it cut into proper blank-lengths, that by a connected mechanism are swaged and shaped into form, the creasing for the nail-holes and the punching of the shaped shoes being accomplished by another and disconnected mechanism.

My improvements upon this class of machines have for their object, first, to give by a continuously-moving mechanism to the heated and entered bar from which the shoes are to be made through the action of rolls and other machinery alternating periods of motion and rest; second, to put in the nail-creases at proper blank-lengths apart in the bar and to progressively move the latter while so creasing it; third, to rough-punch in succession the bar blank-lengths for the nail-holes where creased and to progressively move the bar while rough punching it; fourth, to full-punch in the blank-lengths of the passing bar the nail-holes; fifth, to cut the bar off at proper lengths; sixth, to bend and shape the blank to the required form, and, seventh, to remove the completed shoe from off the frog-form die on which it is shaped and swaged, all of which several operations are done in connected sequence and by a continuously-operating mechanism.

My invention consists (as will be more fully detailed hereinafter in connection with its illustration) of two creasing-rolls that are constructed to be connectedly rotated, and with both of said rolls having operative perimetral segments, which as the rolls are revolved will thereat engage with and so as to move with expelling force an entering bar of heated iron, one of said rolls having upon its operating segmental face blades adapted to enter the face of the bar and produce creases therein for the nail-holes while the rolls are engaging with the bar, and said rolls each being upon its perimetral face where between said operating segments cut away to have a shorter radius thereat, and so that as the creasing-rolls are continuously operated the segments thereof having the greatest radius as they approach each other will engage with the bar to crease it and move it with expelling force, and that part of the rolls having the shortest radius when approaching each other will pass over the bar without engagement therewith, thus creasing and giving to the passing bar by the construction and arrangement of the rolls regularly-alternating periods of movement and rest.

My invention also consists (as will be more fully detailed hereinafter in connection with its illustration) of two rough-punching rolls that are constructed to be connectedly and continuously rotated. One of the rolls has upon its perimetral face a segment containing a groove parallel to the sides of the roll, (which groove has punches projected radially from the bottom thereof,) and parallel also with the perimeter of said roll, where, between the ends of said punch-segments, the roll is cut away to have a less radius thereat than at the punch-segments; and the other of these two rolls has a die-segment made with die-sinks upon its perimetral face, that are adapted to come radially coincident with the punches of the other roller when the two are rotated, and radially coincident also with the rim of said die and sink-roll, where, between the ends of the segment thereon, the roll is cut away to have a less radius than the latter, and so that as the rolls are rotated the punch and die-punch segments (as they approach each other) will engage with the bar to rough-punch it and give to the latter alternating regular periods of motion and rest.

My invention also consists (as will be more fully detailed hereinafter in connection with its illustration) of finishing-punches that are operated for completing the punching and for the removal of the burrs formed on the bar oppositely to where rough-punched, these finishing punches being arranged in series that are connected and adapted to be together vertically reciprocated at one of the periods when the bar is at rest after it has been shaped, creased, and rough-punched at regular blank-lengths, such finishing-punches being constructed and arranged to be operated in connection with a die-plate having holes therein that are vertically in line with the finishing-punches, between which latter and the die-plate the heated bar moves, and so that when the bar is in such a position each one of the finishing-punches will be operated to enter one of the roughly-punched holes in the bar, and in passing through the latter to enter the die-plate and thus punch out and cut off the burr left on the bar by the rough-punching, and after which said finishing-punches will move away from the bar to repeat the operation when another blank-length of the bar is again brought in position.

My invention also consists (as will be more fully detailed hereinafter in connection with its illustration) in the combination, with a mechanism that is constructed to shape, crease, rough-punch, and finish-punch a heated bar for making horseshoes and to move said bar with alternating periods of motion and rest, of a cutting mechanism that is adapted and arranged to cut the bar into proper lengths after it has been creased, rough-punched, and finish-punched, and immediately after entering the swaging and shaping machinery.

My invention also consists (as will be more fully detailed hereinafter in connection with its illustration) in the combination, with a die-wheel having frog-form dies upon its perimetral face, and actuated so as to be continuously revolved, of two bending-levers, each of which is constructed (back of where pivoted) with a spring-arm and a cam-engaging arm having upon its end a friction roller, a spring connecting the spring-arms of the bending levers back of where pivoted, and said bending-levers so placed with reference to said die-wheel that as the latter is revolving each of the frog-form dies thereon will pass between the bending-levers, where at their outer ends provided with bending-rollers, said bending-levers being actuated by a cam-roller that is provided with a cam upon each of its ends, and so placed that the said cams will simultaneously engage with the bending-lever cam-arms back of where pivoted, so as to thereat spread them apart against the recoil force of the connecting-spring, and so cause the front ends of said levers where provided with bending-rollers to more positively come in contact with and follow around on the curved sides of each of said frog-form dies in passing, or to engage with a blank thereon to shape the latter and close in its heel ends around the die.

My invention also consists (as will be more fully detailed hereinafter in connection with its illustration) in the combination, with a die-wheel having constructed upon its perimetral face at regular distances apart frog-form dies, the base-plate of each of which is flat and laterally without curve, said die-wheel being operated to rotate continuously, of a roller constructed with sinks in its cylindrical face, said sinks each having interiorly the exterior form of the frog-form dies of the die-wheel slightly elongated and exteriorly made with rim-plates that project from the face of the roller surrounding the sinks, the outer surfaces of which rim-plates each curve eccentrically from that of the roller, with said sink-roller actuated to revolve continuously with varying speed of rotation and in such a manner relatively to the movement of the die-wheel that each of the frog-form dies of the latter shall enter one of the sinks of the said roller and each of the projecting rim-plates of the sinks will make a tangent engagement with the outer surface of a horseshoe resting on the flat base-plate of one of the frog-form dies, and when thus passing along over it to remove from the shoe any lateral curling or buckling that may have occurred to it during the operation of bending.

My invention also consists (as will be more fully detailed hereinafter in connection with its illustration) in the construction of the parts of the mechanism performing the several functions of entering the bar, creasing it, rough-punching it, full-punching it, cutting off the bar, and for bending the latter so that said several parts performing these functions may be laterally adjusted toward or from each other upon the bed-plate to adapt the mechanism to operate upon blanks of varying lengths, so as to produce horseshoes of differing sizes.

My invention also consists, (as will be more fully detailed hereinafter in connection with its illustration,) and as will be set forth in the claims, in the subcombination of the parts illustrated and described, where such parts perform specific functions.

Accompanying this specification, to form a part of it, there are sixteen plates of drawings containing thirty-six figures, illustrating my invention, with the same designation of parts by letter reference used in all of them.

Figure 2:
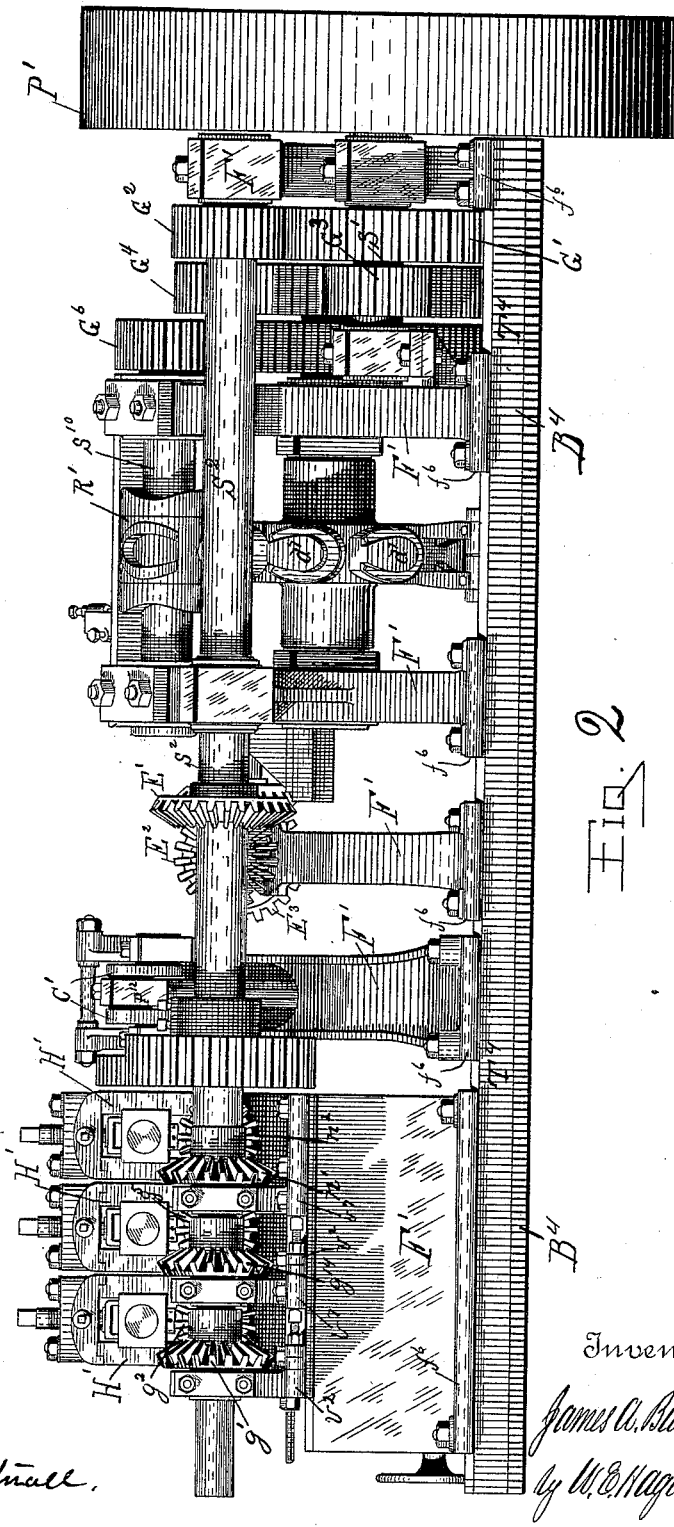
Figure 3:
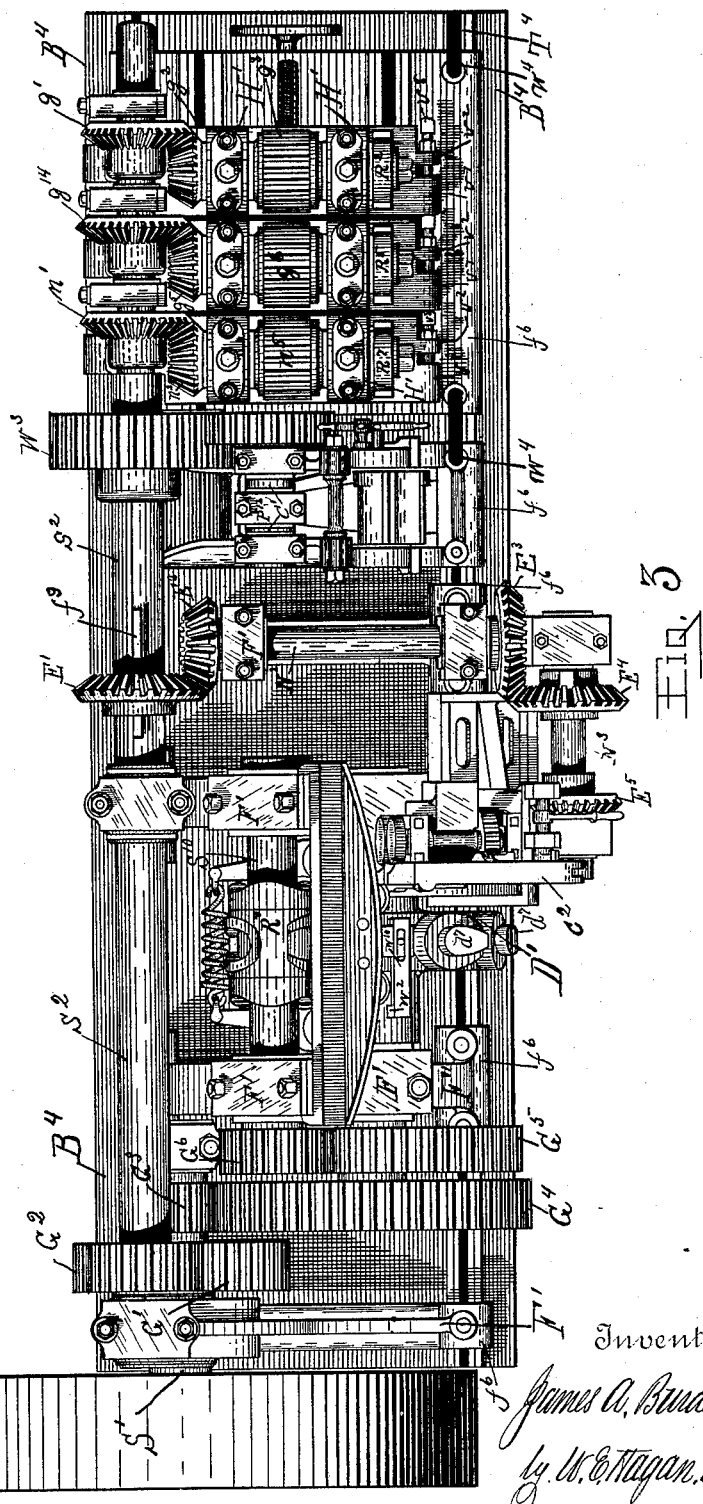
Figure 15:
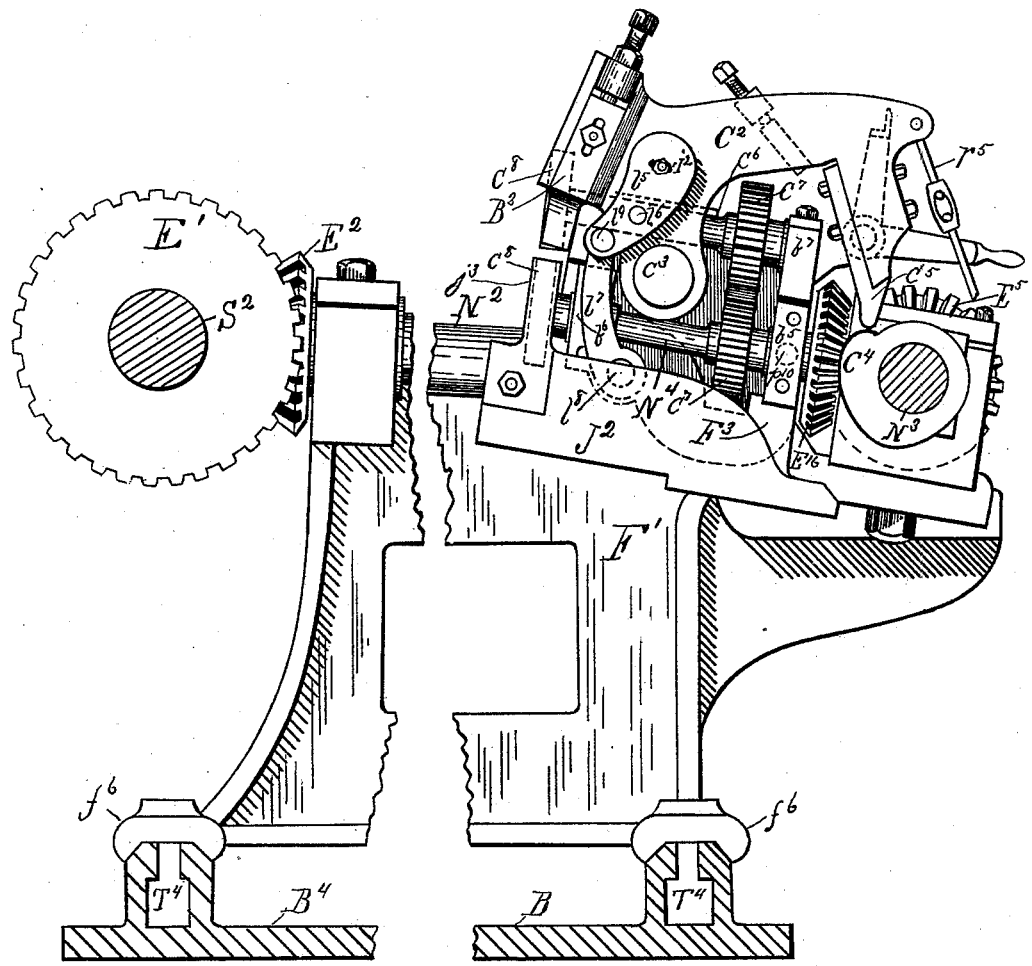
Figure 36:
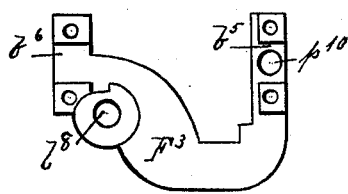
Figure 20:
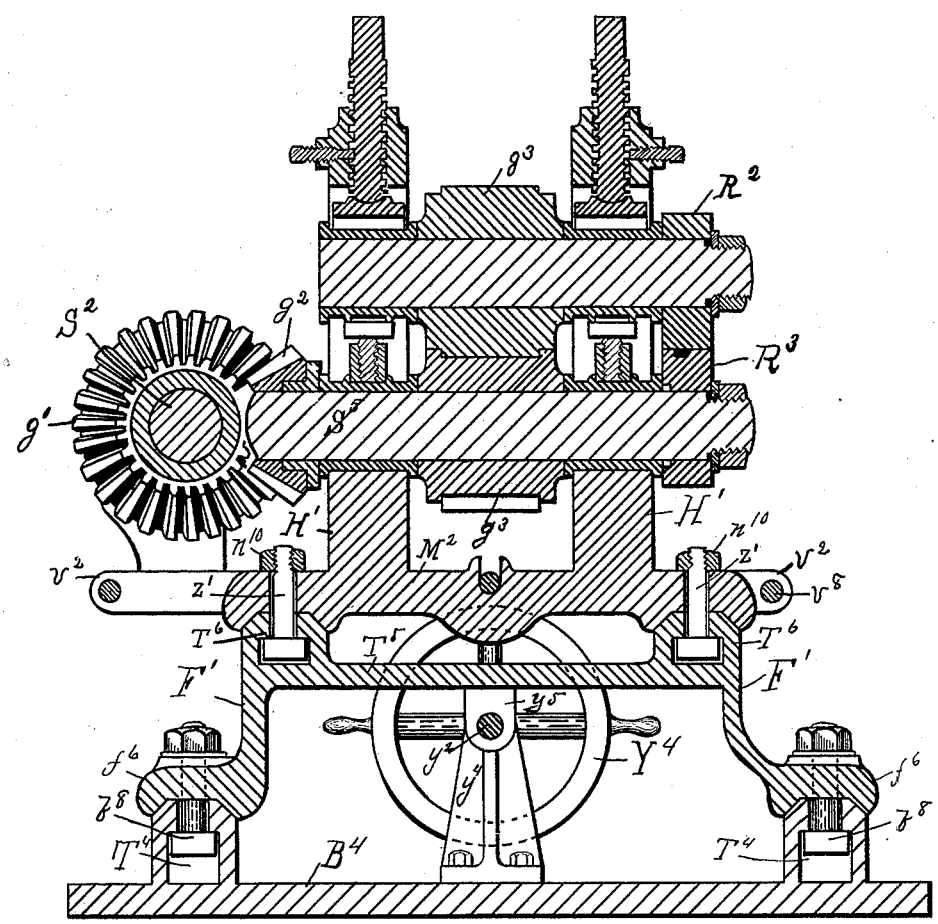

Of the illustrations, Figure 1 shows a side elevation of my horseshoe-machine with that side of it upon which power is applied to the entering, creasing, and rough-punching rolls as fronting the view. Fig. 2 shows a side elevation of the machine, taken on the side which is opposite to that shown at Fig. 1. Fig. 3 is a top view of the machine. Fig. 4 is an elevation of that end of the machine at which the bar to be operated upon is entered, with the parts of the mechanism shown in a larger scale of representation than in the other figures. Fig. 5 is a side elevation of the same mechanism and with the parts in the same position as shown at Fig. 1, but illustrating with them so shown the location and movement of the entered bar. Fig. 6 is a rear end elevation of the parts of the machine with the driving-pulley removed and with its shaft shown in section. Fig. 7 is a side elevation of the full-punching mechanism and the adjacent rough-punching rolls in an enlarged representation and taken on that side of the full-punching apparatus which is opposite to that at which power is applied to operate it. Fig. 8 is a view of the sliding frame, in which and with which the full-punches and their stocks are operated to be reciprocatingly moved vertically in slides constructed in the machine-frame. This illustration shows also the connection made between said sliding frame and a pivoted lever, which operates the latter and the stocks and full-punches moved with it and by it. Fig. 9 is a top view of a part of one of the full-punches, showing one of the two series of punches used connectedly for a shoe-blank. Fig. 10 is a rear view showing the apparatus operating the full-punching mechanism as isolated and taken sectionally on the line $x^2$ $x^2$ of Fig. 5 and through the full-punches, full-punching stocks, full-punching dies, and die-stocks, the shaft on which the double set of punches are turned to reverse, and also through the connection made with the frame that supports the full-punches to operate them. Fig. 11 shows a perspective of the pivoted lever that operates the full-punching frame, stocks, and punches. Fig. 12 shows in section a modification whereby four sets of full-punches are shown as arranged upon one shaft, and also four sets of full-punching dies are arranged upon one shaft instead of two, as shown in the other figures. Fig. 13 shows a side elevation of a vertically-divided half of the four full-punches and four full-punching dies shown in the modification in section at Fig. 12. Fig. 14 is a rear elevation of the die-wheel and its frog-form dies, the sink-roller with the shaft of the latter and that of the die-wheel, taken on the line $x^3$ $x^3$ of Fig. 5 and in advance of the gear-wheel on the shaft of the latter that operates the sink-roller. This view also shows parts of the cutting mechanism with that portion of it which is in advance of or on the opposite side of the die-wheel indicated by a dotted line. Fig. 15 is an end elevation of the cutting mechanism, taken from the rear end, with the parts separated from the other mechanism on the sectional line $x^4$ $x^4$ of Fig. 5. Fig. 16 is a top view of the pivoted bending-levers, the die-wheel, the gear-wheels which operate the sink-roller, and the die-wheel, and illustrating, also, the cams formed in the ends of the sink-roller to actuate the cam-engaging arms on the ends of the pivoted bending-levers, and showing, also, the adjacent parts of the frame and housing that do not roof over the parts illustrated, they having been omitted. Fig. 17 is a top view of the sink-roller, its shaft, and the end cams formed theron to operate the pivoted bending-levers, showing, also, a part of the die-wheel and a cut-off blank in position to engage with and between the adjacent frog-form die of the die-wheel, and the roller ends of the pivoted bending-levers, and illustrating, also, the position of a shoe after having been bent around that one of the frog-form dies that is in advance of the blank shown as just entered, and which bent shoe is illustrated as being flattened out laterally on the flat base-plate of the die which it encircles by the tangent engagement with the top surface of said shoe of the rim-plate of the sink on the sink-roller which the frog-form die that the shoe encircles has entered to pass out of. Fig. 18 shows the same parts of the mechanism that are illustrated at Fig. 17, but with the rim-plate of one of the sinks having nearly finished flattening out and laterally straightening a bent shoe, and another cut-off blank about to be caught (after having been entered) between a succeeding one of the frog-form dies and the pivoted bending-levers. Fig. 19 is a side elevation of the upper part of the die-wheel, an end view of the sink-roller and the cam formed thereon, a side view of the pivoted bending-levers, and an end view of a blank that has been cut off and caught between one of the frog-form dies and the ends of the bending-levers. Fig. 20 is a cross-section taken through the entering-rolls, their housings, and the bed-plate on the line $x^6$ $x^6$ of Fig. 5. This illustration shows, also, in elevation the beveled gear-wheel which communicates motion to the entering and shaping rolls, and shows, also, the adjusting-screw by which the several parts of the mechanism performing the several functions in the forming of the shoe are adjusted to each other as to distance. Fig. 21 is a side view of the lower one of the two entering and shaping rolls. Fig. 22 is an edge elevation of the whole of the lower one of the two shaping and entering rolls and the lower part of the upper one of the shaping and entering rolls. Fig. 23 shows a diametrical section of the lower one of the two shaping and entering rolls, and also a diametrical section of the lower part of the upper one of them. Fig. 24 shows a section of the lower one of the shaping and entering rolls, taken parallel to its sides. Fig. 25 is a side view of one of the two creasing-rolls, both of said rolls in side view being the same. An illustration of one of them illustrates what would be a side view of either of them. Fig. 26 is an edge view of the lower one of the two creasing-rolls, and also the lower part of the upper one of the creasing-rolls. Fig. 27 is a diametrical section of the lower one of the two creasing-rolls, and also a diametrical section of the lower part of the upper one of the creasing-rolls. Fig. 28 is a section of the lower one of the creasing-rolls, taken centrally and parallel to its sides. Fig. 29 is a side view of one of the rough-punching rolls, and as both of these rolls have the same side view this illustration may be taken for either. Fig. 30 is an edge view of the lower one of the two rough-punching rolls. Fig. 31 is a diametrical section of the lower one of the rough-punching rolls. Fig. 32 is a section of the lower one of the rough-punching rolls, taken centrally and parallel to its sides. Fig. 33 is a section of the upper one of the two rough-punching rolls, taken centrally and parallel to its sides. Fig. 34 is an edge elevation of the upper one of the two rough-punching rolls. Fig. 35 is a diametrical section of the upper one of the rough-punching rolls. Fig. 36 shows as detached a part of the frame of the punching mechanism.

The several parts of the mechanism thus illustrated are designated by letter reference, and the function of the parts is described as follows:

The letter P' indicates the driving-pulley, S' its shaft, and G' a gear-wheel arranged thereon to turn with said shaft. This gear-wheel G' meshes into a gear-wheel, G², on the shaft S², by which power is communicated to the entering or shaping rolls, the rough-punching rolls, the creasing-rolls, the full-punching mechanism, and the cutting mechanism, as will be hereinafter detailed.

The letter G³ designates a gear-wheel that is arranged on the same shaft as the driving-pulley, and this gear-wheel G³ meshes into a gear-wheel, G⁴, on the shaft S³, to actuate the die-wheel D', and the letter G⁵ designates a gear-wheel on the die-wheel shaft that meshes into the gear-wheel G⁶ on the shaft S¹⁰ of the sink-roller R', to actuate the latter.

The letters F' designate the frame parts of the machine, and the letters H the housings of the roll mechanism.

The letters R² designate the upper one of the two entering and shaping rolls, and R³ the lower one of them. Power is communicated to the lower one of these shaping and entering rolls by means of a beveled gear, $g^2$, on the shaft S⁵ thereof and the beveled gear-wheel $g'$ on the shaft S². These entering and shaping rolls are each provided with a gear, $g^3$, arranged to mesh into each other, and by which motive power is communicated from the lower roll that receives the power to the upper roll. The entering and shaping rolls have their bearings in the housings H, and the rolls proper project beyond the latter. Each of these shaping and creasing rolls is made with two segmental parts to the perimeters, one of the segments in each roller having a greater radius than the other, and with the differing segments upon each of the rolls arranged to meet as the rolls are rotated, so that when the segments of each of the rolls having the greater radii come together they will engage with an entered bar to move it progressively and at the same time to shape it, if desired, and then, as the segments of the rolls having the shorter radii approach each other in the revolution of the rolls, the latter thereat will pass over the entering bar without engaging with it, and as thus constructed and operated continuously the rolls will give to the bar regular periods of progressive movement and alternating periods of rest. When these rolls R² and R³ are used simply as entering-rolls, then that perimetral face of the lower roller having the longer radius has a recess in revolution formed therein corresponding to the cross-sectional form of the bar to be used, said groove being indicated at $g^4$. When it is desired to use these rolls for shaping the interior edge of the shoe, so as to produce a concave thereat, or so as to make snow or mud shoes, then the lower one of them is constructed to have the shaping-bevel $r'$, as shown at Figs. 22, 23, and 24, with the perimeter of the upper roll plain in its surface and without recess.

The letters R⁴ and R⁵ designate the creasing-rolls, and these rolls are operated by the beveled gear $g^{14}$ on the shaft S² and the beveled gear $g^5$ on the shaft of the lower one of the creasing-rolls and the connecting-gears $g^6$ on the said rolls R⁴ and R⁵. These creasing-rolls are also made with two differing segmental parts upon their perimeters, one of said segments in each roll having a greater radius than the other, and with said differing segments upon each of these rolls arranged to meet as the rolls are rotated, so that when the segments of the rolls having the greater radii come together they will engage with an entered bar to move it progressively and at the same time to crease it for the nail-holes, and then, as the segmental parts of the rolls having the shorter radii approach to meet in the revolution of the rolls, they will pass over the bar without engaging with it.

The lower roll, R⁴, of the creasing-rolls where having the greatest radius is upon its perimeter constructed with blades $b'$, that are outwardly projected from the bottom face of the groove $g^{13}$, made in said roll thereat, and the perimeter of the upper roll, R⁵, is made plain on its perimetral face where having the greatest radius, so that when the two creasing-rolls are rotating with their segments having the greatest radii in contact the blades $b'$ will cut the nail-creases into the lower surface of the bar as the latter is moved progressively by the rolls.

The letters R⁶ and R⁷ designate the rough-punching rolls, and these rolls are actuated by the bevel-gear $n'$ on the shaft S², the beveled gear $n^2$ on the shaft of the lower one of the rough-punching rolls, and the connecting-gears $n^5$ on the said rolls R⁶ and R⁷. These rough-punching rolls, like the entering and creasing rolls, are each constructed with a perimetral segment having a greater radius than the rest of the perimeter, and with the differing segments upon each roll arranged to meet as the rolls are rotated, so that when the segments having the greater radii come together they will engage with an entered bar to move it progressively and at the same time to rough-punch it, and then, as the parts of the rolls having the shorter radii approach in revolution to meet, they will pass over the bar without engaging with it, and thus these rough-punching rolls also give to the bar periods of progressive movement and alternating periods of rest. The lower roll, R⁶, of these rough-punching rolls upon the segment having the greatest radius has two series of punches, $p'$, consisting of four each. These punches are radially arranged in the roll and project beyond the bottom face of the groove $g^{13}$, formed in the perimetral face of said roll R⁶. The segmental face of the upper roll, R⁷, where having the greater radius is made with the sinks $d'$, and these are radially placed therein, so that as the rolls are rotated each one of said sinks in the upper roll will come perimetrally opposite one of the punches of the lower roll, $R^6$. These rough-punching rolls are shown in detail at Figs. 30, 31, 32, 33, 34, and 35. As thus constructed, by the co-operation of the punches in the lower roll and the dies in the upper roll the bar is rough-punched in the nail-creases previously formed therein, and the metal displaced by the entering punches is passed through the bar to appear as a burr on its upper surface.

The grooved segments in each of the three sets of rolls thus described are preferably made of such cross sectional area as will somewhat elongate the bar in its passage and reduce its cross-sectional dimensions, and where it is desirable to have the blank-lengths of the bar of uniform size at what are their ends when cut off the first set of rolls should be keyed onto their respective shafts, so as to engage with the bar a little in advance of where the creasing-rolls will engage with it, and the latter rolls should also be keyed to their respective shafts, so as to engage with the bar a little ahead of the rough-punching rolls, while the rough-punching rolls should be so keyed to their respective shafts as to have the latter rolls engage with the passing bar a little in advance of the creasing-rolls, with the punches and dies of the rough-punching rolls so arranged in their engaging segments as to have them come together in diametrical contact at proper positions within the nail-creases previously formed in the bar, as indicated by the dotted line $d^{10}$ of Fig. 5.

The letters $p^2$ designate two series of punches for full-punching the shoe-lengths of the bar, and these series of punches are placed relatively to each other, so that the two series shall be the same distance apart as the two series of rough-punching holes made at intervals in the bar by the rolls, as before described, and the full-punches of each series are placed the same distance apart and so as to enter the holes in each series that have been produced in the bar by the rough-punching rolls.

The letters $d^{12}$ designate the full-punching dies, of which there are two series, each arranged to be vertically in line with each series of the full-punches. As shown at Figs. 1, 2, 7, and 10, there are two sets of these full-punches and two sets of full-punching dies with each set of full-punches, and each set of full-punching dies arranged to turn on separate shafts, so as to be reversible for repairing or allowing the punches to cool should they become overheated, and in the modification shown at Figs. 12 and 13 there are four sets of full-punches and four sets of full-punching dies, each radially arranged on separate shafts adapted to interchangeably operate.

The letters $S^8$ designate the shaft on which the full-punching stocks $m'$ are turned to reverse, and $S^9$ the shaft on which the stock $m^2$, carrying the full-punching dies $d^{12}$, are turned to reverse.

The letter W', as indicated at Fig. 7, designates a securing-key provided with a hand-wheel, $w^{12}$, which key is threaded into the frame F', and so that when it is screwed into and through the frame it will enter the hole O', made in the sliding frames $m^{12}$, carrying the stocks and full-punches, and thus secure the parts after being reversed and turned on their shaft-connection, and the letter $W^2$ designates a key-stop having a shaft, $b^3$, that is threaded into the frame F', and which when screwed through the latter will enter a hole, $O^2$, made in the ears $E^6$ of the stock $m^2$ of the full-punching dies to secure them in position after being reversed and turned on their shaft-connection.

The letter $W^3$ designates a gear-wheel keyed to and so as to turn with the shaft $S^2$, and $W^4$ is another gear-wheel meshing into the latter wheel and having a shaft, N', turning in bearings in the frame F', as shown at Fig. 10.

The letter C' designates a crank arranged to receive power from the shaft N' on the wheel $W^4$, and $P^{12}$ a pitman which at its upper end is constructed to pivotally connect with said crank C', and at its lower end, $e'$, to pivotally connect with the end $l^2$ of the lever L', as shown at Figs. 2, 3, and 10. This lever is V-shaped, as indicated at Fig. 11, and at its outer end, $l^3$, it is arranged to turn on the fixed shaft or bar $h'$ as it is reciprocatingly oscillated by the combined action of its connection with the pitman $P^{12}$ and the crank-connection, which the latter makes with the wheel $W^4$.

The letter U indicates a web connecting the two arms I' of the lever L', and the letter J' indicates a web or cross-bar connecting the two vertical sides of the slide-frame $m^{12}$, that carries the full-punching stocks $m^2$, and also the two series of full-punches $p^2$.

The letter $L^2$ designates a link, which at its upper end, $j$, is journaled onto the web or cross-bar J' of the sliding frame, and at its lower end, $j^2$, it is journaled onto the arms I' of the lever L', as shown at Figs. 7, 8, and 10. When the lever L' as thus connected is operated, it moves reciprocatingly and vertically, the slide-frames $m^{12}$ carrying the full-punching stocks and punches upwardly in the slides of the machine-frame (said slides being indicated by the dotted line $d^6$ of Fig. 7) nd as to force the punches to enter the holes before rough-punched in the bar Y' by the rolls, and so as to punch out the burr left on their upper surface while the bar is at rest, and to then move away from the latter.

The letter E' designates a beveled gear on the shaft $S^2$, and $E^2$ a beveled gear on the shaft $N^2$, which gear engages with said beveled gear E'.

The letter $E^3$ designates a beveled gear on that end of the shaft $N^2$ that is opposite to that at which it receives power from the shaft $S^2$.

The letter $E^4$ designates a beveled gear on one end of the shaft $N^3$, that meshes into the beveled gear $E^3$, and $E^5$ a beveled gear on the other end of said shaft N³, which meshes into the beveled gear E¹⁶ on the shaft N⁴, operating the cutting mechanism, as shown at Figs. 3, 14, and 15.

The letter C², as shown in detail at Figs. 3, 14, and 15, designates the cutter-arm, and c³ a pivot on which it is adapted to be oscillated.

The letter c⁴ designates a cam arranged on and so as to turn with the shaft N³, and C⁵ a tappet-foot constructed on the outer end of the cutter-arm C² at its bottom, whereby as said shaft N³ and the cam thereon are turned said front end of the cutter-arm is actuated to descend and bring into action a blade, B², that is downwardly projected therefrom. After the cutter-arm and blade are thus caused to descend, they are (as the cam turns so as to cease its engagement with the tappet) caused to ascend on the pivoted connection at c³ by means of a spring connected with a rod, r⁵, said spring not being shown in the drawings.

The shaft N⁴, before named, has its bearings at b⁵ b⁶ in the pivoted frame part F³.

The letter c⁶ designates a shaft having its bearings at b⁷ in the frame part F², as shown at Fig. 4, and the letters c⁷ designate gears arranged on the shafts N⁴ and c⁶, to communicate motion from one to the other of said shafts, and a roller, c⁸, on the outer end of each of the latter, between which rollers the bar to be cut off passes, and which rollers, when engaging therewith, co-operate to move the bar, and the lower one of which rollers is adapted (when the cutting-blade is descending) to drop down from its engagement with the bar, as will be subsequently described.

The blade B² is projected downwardly from the cutter-arm C² toward the anvil or plate j³, whereon the bar is cut, as shown in part at Figs. 1 and 3 and in detail at Figs. 14 and 15.

The letters l⁵ designate a link that is pivoted to the cutter-arm C² at l⁶, and at its upper end is secured to the cutter-arm by a bolt passing through a slot, i², as shown at Figs. 14 and 15, and which slot allows the said link to move on its pivot at l⁶ to the extent of the slotted opening i² for the adjustment of the cutter-arm.

The letter l⁷ designates another link that is pivoted to the frame part F³, (shown as detached at Fig. 36,) and which frame part F³ is also pivoted at p¹⁰ to the frame part F², the upper end of said link l⁷ being pivoted to the link l⁵ at l⁹. The function of these links and their connections is to move downwardly the frame part F³ on its pivoted connection, and also the outer end of the shaft N⁴, having its bearings in said frame part, so that the roller c⁸ on the outer end of said shaft N⁴ will drop down a little, and so as not to engage with the bar while the blade B² is descending.

The cutting mechanism thus described, considered apart from its combination with the parts performing connected functions, I make no claim to herein.

The die-wheel D' has formed on its perimeter at regular distances apart the frog-form dies d⁷, which on their exterior faces are curved at f', and each of them is constructed with a flat base-plate, p⁵, having no lateral curve. This die-wheel, as shown in detail at Figs. 16, 17, 18, and 19, is constructed to be continuously operated when the machine is running, and by means of the gear-wheel G³ on the driving-pulley shaft, which meshes into the gear-wheel G⁴ on the die-wheel shaft S³. This die-wheel and the frog-form dies constructed thereon are shown at Figs. 1, 2, and 3, and in connection with the other mechanism with which it immediately connects at Figs. 14, 16, 17, 18, and 19.

The letter R' designates the sink-roller and S¹⁰ its shaft, the latter having its journal-bearings at m⁵ m⁵ in the frame F', and with the sink-roller located above and a little toward one side of the vertical diametrical center of the die-wheel.

The letters u designate sinks having an interior form corresponding exteriorly to that part of the frog-form dies that is outside of the base-plate, but somewhat longer than the said dies thereat, and these sinks are of such size that the frog-form dies where projected beyond the base-plate thereof will enter the sinks while the die-wheel and the sink-roller as relatively placed are rotated together, as shown at Figs. 2, 3, 14, 16, 17, 18, and 19.

The letters p⁶ indicate rim-plates that are outwardly projected from the roller-face around each of said sinks, so as to border them on their edges at all parts excepting the heel part. On their outer face these rim-plates in their contour from the cylindrical face of the roller have the form of a flattened crescent in section, and as shown at Fig. 14. This sink-roller R' is operated by the gear-wheel G⁶, and this gear-wheel has the pitch-line of its gears differentiated at intervals, and as shown by the dotted line d¹⁰ of Fig. 6. The gear-wheel G⁵, which actuates said gear-wheel G⁶, has the peripheral line of its gear-tips so differentiated circumferentially and at regular intervals as to co-operate with the construction of the gears upon the wheel G⁶ to move the said sink-roller at certain intervals more rapidly than at others and more rapidly than the die-wheel, and so that the rim-plates each of them will as turning with the sink-roller make a continuous tangent engagement with a shoe (upon the base-plate of each of the frog-form dies) to straighten it out and to remove from it all lateral distortion or buckling, the sinks u being made enough longer than the frog-form dies to permit the movement of the latter within the sinks in the direction of the intervals of increased speed.

The letters T' designate the pivoted bending-levers, which are partly illustrated in the general view of the machine at Fig. 3 and in enlarged detail at Figs. 16, 17, 18, and 19. These bending-levers are arranged to be over the top of the die-wheel D', and so as to pass around the ends of the sink-roller. They are each pivoted at t² to an offset, t³, projected from the machine-frame. The outer ends, t⁸, of each of these levers approach each other at an angle, and their inner ends, $e^6$ $e^6$, back of where pivoted are curved inwardly toward each other and the adjacent end face of the sink-roller, whereat each of the said inner ends of each of the levers is constructed with a friction-roller, as indicated by the dotted line $m^6$. The letters $t^6$ designate a spring arm projected from each of these levers T' at their inner ends, and the letter A a spring arranged intermediately to and connecting with each of said spring-arms. These bending-levers at the front ends are arranged with reference to the die-wheel, so that as the latter revolves toward the outer ends of the levers one of the latter, where constructed with bending-rollers $t^7$, will engage with the adjacent side of each passing frog-form die or with a shoe-blank that has been passed in between the said die, (while moving,) so as to abut against the blank-stop $w^2$, by which engagement between the bending-rollers of the levers the blank will by the latter be carried around the sides and rounded end of the die and closed in against the heel ends of the latter.

The letters $K^2$ designate a cam formed upon each of the opposite end faces of the sink-roller, and each of which cams is constructed to simultaneously engage with one of the inner ends, $e^6$, of the bending-levers back of where pivoted, and where each of them is provided with a friction-roller. As the inner ends, $e^6$, of the bending-levers T' are spread apart by the action of the cams $K^2$, the front ends of the bending-levers, where arranged to engage with the shoe-blank, are forced toward each other, and to thus bend the blank around the sides of that one of the frog-form dies upon which the blank is being shaped as moved. After one shoe has been thus bent and shaped, the die on which it is held passes it to be operated upon by the sink-roller and its sink-rim plate, as before described, and the bending-rollers open out again to operate upon another entered blank in connection with a succeeding frog form die, brought into position by the rotation of the die-wheel.

The letter $B^4$ designates the bed-plate, which is continued throughout and under the several mechanisms. This bed-plate is made with a grooved track, $T^4$, at each side, extending throughout its length. This track is shown in a plan view in part at Fig. 16 and in cross-section at Figs. 15 and 20. This track has an arbored top, and it is provided, as indicated at $w^4$, Fig. 3, with sections where the arbor-roof is cut out to enter a bolt-head and where the bolts and nuts have been removed for illustration.

Each of the several mechanisms, performing the functions of entering the bar, creasing it, rough-punching it, full-punching it, and the cutting mechanism, are provided with feet $f^6$, that spread out laterally as supports at each side to rest upon this track $T^4$ and as shown in section at Figs. 4, 6, 14, 15, and 20.

The letters $b^8$ at Fig. 20 designate bolts adapted to be entered in said track at any of the open sections $w^4$, and therefrom moved along and passed up through the feet $f^6$ of the several mechanisms, and to be there secured by a nut to anchor the parts of the machine which perform the several and specific functions of working the bar, so that upon this track $T^4$ the full-punching mechanism and the cutting mechanism may be adjusted as to distance from each other or toward or from the rolls.

The letter $T^5$ designates a supplemental bed-plate arranged to support the entering-rolls, the creasing-rolls, and the rough-punching rolls, and this supplemental bed-plate is adapted, by means of side flanges at its base, to connect with the bed-plate $B^4$ and track $T^4$ by means of bolts, as before described, for doing the same with the other mechanism. This supplemental bed-plate is shown in section at Fig. 20, and it is constructed, also, with an arbored and grooved track, $T^6$, that is adapted to adjustably connect the rolls-table $M^2$ by means of bolts $z'$, the heads of which are entered in the grooved and arbored track of the supplemental bed-plate, with the shanks of the bolts passed up through the top of the track from out the groove thereof, and also through the edge of the rolls-table, and to be thereat secured by a nut, $n^{10}$.

The letter $Y^4$ designates a hand-wheel having a shaft, $y^2$, that is threaded into a standard, $y^4$, on the bed-plate proper, $B^4$, and also into the leg $y^5$ on the supplemental bed-plate $T^5$. When the bolts which secure the downwardly and outwardly flanged feet of the supplemental bed-plate to the bed-plate proper are loosened by turning the hand-wheel, the said supplemental bed-plate and the sets of rolls that it supports may be moved toward or from the full-punching mechanism.

The letters $v^2$ designate lugs projected from the sides of the housings of the creasing-rolls and the rough-punching rolls at their base, and the letters $v^8$ designate set-screws made to thread into said lugs, so as to be parallel to the sides of the housings. The set-screws of each of the housings upon the outer ends of their rectangular heads, by which they are turned, are made to abut against a projection, $v^7$, on the housing of the adjacent set of rolls for a close adjustment of the housings as to distance apart when being moved for the latter purpose in the arbored track, as before described and as shown at Figs. 1, 2, 3, 5, and 20.

The letter $V^{17}$ designates a forked plate that is upwardly projected from the bed-plate and arranged to intersect the circular line of traverse made by the frog-form dies of the die-wheel at each of their sides and engage with the bent shoes held thereon to remove them, as shown at Fig. 14.

The several beveled gears upon the shaft $S^2$, from which the several mechanisms receive power, are all feathered onto the said shaft, as shown at $f^9$ of Fig. 3, so that they may be adjusted thereon to meet the adjustment of the beveled gears, in connection with which they communicate power to the several sets of rolls. The full-punching mechanism, the cutting mechanism, and the die-wheel D' are made with a removable die-plate, $d^{11}$, by which dies of differing size may be applied thereto.

The combined operation of the several mechanisms thus described and shown is as follows: A heated bar, Y', is entered in the direction of the arrow shown at Fig. 5, so that its entered end will be caught between the engaging segments of the shaping-rolls at the point where their rotating contact commences, and as these segments are engaging with the bar it will thereat be operated upon by said rolls and moved progressively until the non-engaging segments of the entering-rolls meet, when the progressive movement of the bar ceases. After the entering-rolls have in sequence engaged with another blank-length of the bar, its entering end will have reached the creasing-rolls, which operate to crease and move it a blank-length progressively. After the entering end of the bar has passed the creasing-rolls, it is rough-punched while the creasing-rolls and the entering-rolls are operating upon succeeding blank-lengths, when the bar reaches the full punching mechanism, and while at rest that blank-length of its which is above the punches is full-punched, as before described, and then progressed by the action of the several rolls to pass in under the guide-plate $w^{10}$ and to abut against the stop $w^2$, and as thus placed between one of the frog-form dies and the bending-levers it is cut off by the cutting mechanism at a proper length for a shoe, to be then bent by said levers, flattened by the rim-plates of the sink-roller, and when reaching the forked plate to be removed from the die, the same operation being continued as bar after bar follows with intermittent periods of motion and rest.

As the operation of rolls constructed and arranged to give to an entered and heated bar regular periods of progressive movement and alternating periods of rest would be the same, whether the full-punching, cutting, and bending mechanisms used were those shown or some other which would perform the same function, I do not limit my invention of the rolls as constructed to so operate upon the bar, with periods of progressive movement and periods of rest, to their combination with the full-punching, cutting, and bending mechanisms, which I illustrate and describe.

Having thus described my invention, what I claim, and desire to secure by Letters Patent, is—

1. In a machine for making horseshoes by a series of connected operations, the combination of two rolls connected by gears to move continuously, said rolls each being constructed with an engaging perimetral segment and a non-engaging perimetral segment, the latter having less radius than the engaging segments, a groove made in the engaging segment of one of the said rolls, said groove having a beveled side, with the said engaging segments constructed and arranged to engage with an entered bar of iron to move and shape the same, and said non-engaging segments constructed to pass over the said entered bar without engagement, substantially in the manner as and for the purposes set forth.

2. In a machine for making horseshoes by a series of connected operations, the combination of two rolls connected by gears to move continuously, said rolls each being constructed with an engaging perimetral segment and a non-engaging perimetral segment having less radius than the engaging segments, a groove made in one of the engaging perimetral segments parallel to the sides of the rolls, two blades upwardly projected from the bottom of said groove, with said engaging segments and groove thus constructed arranged to engage with an entered bar of iron to progressively move and to crease said bar, and said non-engaging segments of the rolls constructed and arranged to pass over said bar without engagement therewith, substantially in the manner as and for the purposes set forth.

3. The combination of two rolls connected by gears to be rotated together, each of said rolls being constructed with a perimetral segment on its roller-face, which segments will engage as the rolls turn, a groove made in the engaging segment of the lower roll parallel to its sides, said groove containing projecting punches, sinks made in the engaging segment of the upper roll adapted to come coincidently in line with each of said punches as the rolls turn, and each of said rolls having a non-engaging segment on its roller-face between the ends of the engaging segments, substantially in the manner as and for the purposes set forth.

4. In a mechanism for full-punching a bar of iron that has been previously creased and rough-punched in proper lengths for horseshoe-blanks, the combination, with a frame that is constructed and actuated to be vertically reciprocated in a slideway at each of its sides, of a shaft that is arranged horizontally and journaled in the sides of said frame to move therewith, arms projecting from said shaft, said arms having stocks secured therein and containing punches projected therefrom, and a lock-bar constructed to connect and disconnect said stocks to and from the side frame, substantially in the manner as and for the purposes set forth.

5. In a mechanism for full-punching a bar of iron that has been previously rough-punched and creased at proper lengths for horseshoe-blanks, the combination, with a series of punches adapted to be passed through the previously rough-punched holes in the bar, of a shaft having stocks therein containing dies that may be oppositely brought into position to be vertically in line with said punches and there secured, substantially in the manner as and for the purposes set forth.

6. In a machine for full-punching a bar of iron that has been previously creased and rough-punched for nail-holes at proper distances apart for horseshoe-blanks, and which bar is operated to move with regular periods of motion and alternating periods of rest, the combination, with punches constructed to be moved to enter the holes previously rough-punched in the bar, with vertical reciprocation while such bar is at one of its periods of rest, of dies having sinks made to be vertically in line with said punches, constructed and arranged to be operated substantially as shown and described.

7. In a mechanism for bending horseshoe-blanks, the combination, with a die-wheel that is actuated to revolve continuously while the mechanism is operating, and having frog-form dies upon its perimetral face at regular intervals, of two bending-levers that are each of them between their ends pivoted to a support, and each arranged above and upon the opposite sides of the passing frog-form dies, each of said levers back of where pivoted being constructed with a cam-arm, and a cam-roller having end cams, each of which latter is arranged to engage with one of the cam-arms upon each of the levers back of their pivot, and so as to cause the front ends of said levers to close around a blank on the frog-form dies, substantially in the manner as and for the purposes set forth.

8. In a mechanism for bending and shaping horseshoes, the combination, with a wheel having frog-form dies upon its perimeter at regular intervals, said dies having flat base-plates, of pivoted bending-levers constructed to engage with an entered blank and bend it around one of the frog-form dies, and a roller provided with sinks in its cylindrical face having interiorly the exterior form of the frog-form dies, each of said sinks having a rim-plate the interior face of which is eccentric to the roller-face, and gears upon said sink-roller, and the gear which operates it so differentiated as to pitch-line that the said rim-plate will tangent with and press upon a shoe resting on the flat face-plate of each of the frog-form dies as the wheel of the latter and the sink-roller move together, substantially in the manner as and for the purposes set forth.

9. The combination, with the die-wheel D', made with the frog-form dies having flat base-plates, of the sink-roller R', made with the sinks $u$, having the eccentric rim-plates $p^6$, the gear-wheel $G^6$ on the sink-roller, and the gear-wheel $G^5$ on the die-wheel shaft, said gears each being constructed to differentiate as to pitch-line, substantially in the manner as and for the purposes set forth.

10. The combination, with the bed-plate proper, $B^4$, made with the grooved and arbored track $T^4$, of the supplemental bed-plate $T^5$, made with a grooved and arbored track, $T^6$, the rolls-table $M^2$, adapted to connect with said supplemental bed-plate by bolts, substantially as described, the standard $y^4$ on the bed-plate proper, the leg $y^5$ on the supplemental bed-plate, and the adjusting screw-shaft $y^2$, with said shaft threaded into said leg, substantially in the manner as and for the purposes set forth.

11. In a horseshoe-machine, the combination of a pair of rolls constructed to receive a bar of heated iron and move it progressively with alternating periods of motion and rest, and to crease the bar for the nail-holes while moving it, a secondary set of rolls constructed to receive said bar in continuity from the before-named rolls and to move it progressively with the same alternating periods of motion and rest as the first rolls, and to rough-punch the bar while moving it, substantially in the manner as and for the purposes set forth.

12. In a horseshoe-machine, the combination of a primary pair of rolls connected by gears to continuously rotate, with each of said rolls constructed to have an engaging and a non-engaging perimetral segment which operate said primary rolls to engage with an entered bar of iron to give to the latter alternating periods of progressive motion and rest, a secondary set of rolls connected and constructed, like the primary set of rolls, with an engaging and non-engaging perimetral segment that will operate to move the bar in the same manner and with the same alternating periods of motion and rest as the primary rolls, one of said secondary rollers being constructed with a perimetral groove in its engaging segment, said groove being provided with creasing-blades, and a third pair of rolls connected and constructed like the aforesaid rolls, and each having an engaging and non-engaging segment, with a groove in one of the engaging segments constructed with punches and the other roll of said third pair constructed with sinks on its perimetral engaging segment arranged to come in line with said punches as the rolls rotate to move the bar with alternating periods of motion and rest, as shown and described.

13. In a machine for making horseshoes by a continuous operation, the combination, with three pairs of rolls constructed to move together and to give to the entered bar of iron from which the shoes are made alternating periods of motion and rest by means of engaging and non-engaging perimetral segments formed on said rolls, said three pairs of rolls being severally constructed to shape, crease, and rough-punch the bar, substantially as described, of punches arranged and constructed to be vertically reciprocated while said bar is at rest, so as to enter the holes previously rough-punched therein, and dies vertically in line with said vertically-operating punches, substantially in the manner as and for the purposes set forth.

14. In a machine for making horseshoes by a continuous operation, the combination, with three pairs of rolls constructed to move together and to give to the entered bar from which the shoes are made alternating periods of motion and rest by means of engaging and non-engaging perimetral segments formed therein, with said three sets of rolls severally constructed to shape, crease, and rough-punch the bar, as shown and described, of punches arranged and constructed to be reciprocated vertically, so as to enter the holes previously rough-punched in the bar while the latter is at rest, substantially as described, dies vertically in line with said vertically-operating punches, a blade operated to cut said bar into blank-lengths while the bar is at rest, substantially as described, a rotating die-wheel having thereon perimetrally-placed frog-form dies, and bending-levers operated by cams to bend each of said cut-off blank-lengths around one of the frog-form dies, substantially in the manner as shown and described.

Signed at Troy, New York, this 2d day of December, 1887, and in the presence of the two witnesses whose names are hereto written.

JAMES A. BURDEN.

Witnesses:
NICHOLAS J. GABLE,
W. E. HAGAN.